UNITED STATES PATENT OFFICE.

AKIM TKATSCH, OF LUDWIGSHAFEN, GERMANY, ASSIGNOR TO THE BADISCHE ANILIN & SODA FABRIK, OF SAME PLACE.

BROWN AZO DYE.

SPECIFICATION forming part of Letters Patent No. 671,904, dated April 9, 1901.

Application filed November 10, 1900. Serial No. 36,106. (No specimens.)

*To all whom it may concern:*

Be it known that I, AKIM TKATSCH, doctor of philosophy, a subject of the Czar of Russia, residing at Ludwigshafen-on-the-Rhine, Kingdom of Bavaria, and Empire of Germany, have invented new and useful Improvements in Azo Dye from Picramic Acid and Hydroxy-Phenyl-Glycocol Sulfo-Acid IV from Amido-Phenol Sulfo-Acid IV, of which the following is a specification.

In the German Patent No. 70,788 an amidophenol sulfo-acid known as "amido-phenol sulfo-acid IV" is described. I have discovered that if this be treated with monochlor acetic acid in the presence of sodium acetate a new hydroxy-phenyl-glycocol sulfo-acid is obtained. I call this "hydroxy-phenyl-glycocol sulfo-acid IV." This constitutes a new component for the manufacture of azo dyes by combination with diazo compounds and the like. In particular I have discovered that the azo dye obtained from this new component and diazotized picramic acid is of value. It dyes wool red-brown from the acid-bath. If the dyed goods be then treated with a chromate, the shade turns to a dark-brown color and possesses a high degree of fastness against the action of milling and does not bleed onto white wool, cotton, or silk during this operation. The fastness against washing and the action of light is also very good.

The following examples will serve to illustrate the manner in which the invention can be carried into practical effect and my new coloring-matter obtained. The parts are by weight.

*Example 1—Production of the new hydroxy-phenyl-glycocol sulfo-acid IV from the amido-phenol sulfo-acid IV.*—Dissolve one hundred and ninety (190) parts of the aforesaid amido-phenol sulfo-acid IV in one thousand (1,000) parts of water. Then dissolve ninety-five (95) parts of monochlor-acetic acid in this solution and add to it three hundred and forty (340) parts of crystallized sodium acetate. Boil this mixture for about five (5) hours in a vessel fitted with an inverted condenser. Allow the temperature to fall and subsequently cool the solution thoroughly with the aid of ice. The acid sodium salt of the desired compound separates out. Collect it by filtering and press it. It is not always necessary to isolate the product in the manner described, as its solution can, if desired, be used directly for the production of azo coloring-matters.

*Example 2—Production of an azo dye from picramic acid and the new hydroxy-phenyl-glycocol sulfo-acid IV.*—Prepare the diazo compound of picramic acid in the well-known way and collect it by filtering. Stir about twenty (20) parts thereof into three hundred (300) parts of water and add this solution to a solution of thirty (30) parts of the new hydroxy-phenyl-glycocol sulfo-acid, such as can be obtained according to Example 1, in two hundred (200) parts of water containing about twenty-seven (27) parts of calcined soda. Stir the solution until the combination is complete. Precipitate the coloring-matter formed with common salt, filter, press, and dry.

My new coloring-matter thus obtained is soluble in water, giving a yellow-red solution. If this solution be rendered alkaline by the addition of an excess of carbonate of soda, the shade becomes redder. In concentrated sulfuric acid it dissolves, giving a wine-red solution.

Now what I claim is—

The new azo coloring-matter which can be obtained by the combination of diazotized picramic acid and hydroxy-phenyl-glycocol sulfo-acid IV which dyes wool from the acid-bath a red-brown which shade turns a dark-brown color upon treatment with potassium bichromate and which gives a yellow-red solution in water turning yellow upon the addition of an excess of carbonate of soda and which gives a wine-red color with sulfuric acid substantially as described.

In testimony whereof I have hereunto set my hand in the presence of two subscribing witnesses.

AKIM TKATSCH.

Witnesses:
 ERNEST F. EHRHARDT,
 JACOB ADRIAN.